United States Patent
Caldwell et al.

(10) Patent No.: US 7,670,584 B2
(45) Date of Patent: *Mar. 2, 2010

(54) INORGANIC METAL CHALCOGEN CLUSTER PRECURSORS AND METHODS FOR FORMING COLLOIDAL METAL CHALCOGENIDE NANOPARTICLES USING THE SAME

(75) Inventors: Marissa A. Caldwell, Middleton, WI (US); Delia J. Milliron, Menlo Park, CA (US)

(73) Assignees: International Business Machines Corporation, Armonk, NY (US); The Board of Trustees of the Leland Stanford Junior University, Stanford, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 11/757,056

(22) Filed: Jun. 1, 2007

(65) Prior Publication Data

US 2008/0299033 A1    Dec. 4, 2008

(51) Int. Cl.
 *C01B 17/00* (2006.01)
 *C01B 19/00* (2006.01)
(52) U.S. Cl. ............... 423/508; 423/509; 423/511; 423/561.1; 423/566.1; 977/813; 977/814; 977/824
(58) Field of Classification Search ........... 977/813, 977/814, 824; 423/508, 509, 511, 561.1, 423/566.1; 252/62.3 GA, 62.3 ZT, 62.3 V
See application file for complete search history.

(56) References Cited

U.S. PATENT DOCUMENTS

| | | | |
|---|---|---|---|
| 6,126,740 A | 10/2000 | Schulz et al. | |
| 6,207,392 B1 | 3/2001 | Weiss et al. | |
| 6,788,626 B2 | 9/2004 | Fujimoto | |
| 6,821,337 B2 | 11/2004 | Bawendi et al. | |
| 6,875,661 B2 | 4/2005 | Mitzi | |
| 6,911,081 B2 | 6/2005 | Andriessen | |
| 7,094,651 B2 | 8/2006 | Mitzi et al. | |
| 7,160,489 B2 | 1/2007 | Didenko et al. | |
| 2002/0006580 A1 | 1/2002 | Ishimaru et al. | |
| 2002/0106476 A1 | 8/2002 | Hirai et al. | |
| 2005/0158909 A1 | 7/2005 | Milliron et al. | |
| 2006/0073667 A1 | 4/2006 | Li et al. | |
| 2006/0110313 A1 | 5/2006 | Cho et al. | |
| 2006/0251569 A1* | 11/2006 | Ren et al. .................. 423/510 |
| 2007/0264504 A1* | 11/2007 | Mitzi et al. ............. 428/411.1 |

FOREIGN PATENT DOCUMENTS

WO     2004108598 A1    12/2004

OTHER PUBLICATIONS

Bawendi, Moungi G., et al., "The Quantum Mechanics of Larger Semiconductor Clusters ("Quantum Dots")" Annual Reviews Phys. Chemistry, 1990.41, pp. 477-496; www.annualreview.org/aronline.
Murray, C. B., et al., "Synthesis and Characterization of Nearly Monodisperse CdE (E=S, Se, Te) Semiconductor Nanocrystallites", J. Am. Chem. Soc., 1993, 115, pp. 8706-8715.
Trindade, Tito, et al., "A Single Source Approach to the Synthesis of CdSe Nanocrystallites**", Advanced Materials, 1996, 8, No. 2, pp. 161-163.
Trindade, Tito, et al., "Synthesis of CdS and CdSe Nanocrystallites Using a Novel Single-Molecule Precursors Approach", Chemical Materials, 1997, 9, pp. 523-530.
Malik, Azad M., et al. "Air-Stable Single-Source Precursors for the Synthesis of Chalcogenide Semiconductor Nanoparticles", Chemical Materials, 2001, 13, pp. 913-920.
Nair, P. Sreekumari et al., "Preparation of CdS nanoparticles using the cadmium(II) complex of N,N'-bis (thiocarbamoyl)hydrazine as a simple single-source precursor", Journal of Materials Chemistry, 2001, 11, pp. 1555-1556.
Cumberland, Scott L., "Inorganic Clusters as Single-Source Precursors for Preparation of CdSe, ZnSe, and CdSe/ZnS Nanomaterials", Chemical Materials, 2002, 14, pp. 1576-1584.
Green, Mark, "Solution routes to III-V semiconductor quantum dots", Current Opinion in Solid State and Materials Science, 6, Apr. 2002, pp. 355-363, available at 222.sciencedirect.com.
Mitzi, David B., Synthesis, Structure, and Thermal Properties of Soluble Hydrazinium Germanium(IV) and Tin(IV) Selenide Salts, Inorganic Chemistry, 2005, vol. 44, No. 10, pp. 3755-3761.
Nairn, Justin J. et al., "Preparation of Ultrafine Chalcopyrite Nanoparticles via the Photochemical Decomposition of Molecular Single-Source Precursors", Nano Letters, 2006, vol. 6, No. 6, pp. 1218-1223.

* cited by examiner

*Primary Examiner*—Timothy C Vanoy
(74) *Attorney, Agent, or Firm*—Cantor Colburn LLP

(57) ABSTRACT

Methods for forming colloidal metal chalcogenide nanoparticles generally include forming soluble inorganic metal chalcogen cluster precursors, which are then mixed with a surfactant and heated to form the colloidal metal chalcogenide nanoparticles. The soluble inorganic metal chalcogen cluster precursors are generally formed using a hydrazine-based solvent. The methods can be used with main group and transition metals.

1 Claim, 2 Drawing Sheets

INORGANIC METAL CHALCOGEN CLUSTER PRECURSORS AND METHODS FOR FORMING COLLOIDAL METAL CHALCOGENIDE NANOPARTICLES USING THE SAME

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to inorganic metal chalcogen cluster precursors and methods for forming colloidal metal chalcogenide nanoparticles using the inorganic metal chalcogen cluster precursors.

2. Description of Background

Metal chalcogenides are a range of compounds that contain a metal and a Group VI element such as sulfur, selenium, or tellurium. These compounds may be in binary, ternary, or quaternary form. Colloidal nanoparticles formed of the metal chalcogenides have been used to fabricate a wide range of optical and electronic devices including light emitting diodes, solar cells, optical recording media (phase change), thin film transistors, and the like. These materials have also been used as luminescent "tags" for biological labeling and have exhibited lasing and other nonlinear optical effects. Colloidal metal chalcogenide nanoparticles have been synthesized by mixing, in solution, precursors containing the metal element(s) with a precursor containing the chalcogen element and at least one surfactant that provides for dispersion in the solution. A controlled precipitation reaction occurs, wherein the various different precursors react to form the metal chalcogenide nanoparticles and the surfactant coats the particle surface to limit growth. The precipitation reaction normally requires high temperatures (e.g., temperatures of 250 to 360° C.) in order to decompose the precursors, overcome the energetic barrier to nucleation, and form nanoparticles, particularly if crystalline nanoparticles are desired.

Some of the known problems with the co-precipitation route to nanoparticle synthesis include, but are not limited to, the high temperatures noted above that are needed to initiate the reaction between the decomposing precursors (i.e., the reaction between the metal precursor and the chalcogen precursor) and that suitable precursor combinations must be discovered that are both soluble in the reaction mixture and that decompose at a sufficiently low temperature, i.e., at temperatures below at or below the boiling point of the solvent. While a few chalcogen precursors have been found suitable for a wide range of metal chalcogenides, a suitable precursor must be discovered for each new metal to be used. This has led to extensive development of nanoparticle synthesis for certain metals such as cadmium (Cd), zinc (Zn), or mercury (Hg), with limited success in using analogous synthetic methods for other metal chalcogenides. In some cases, it has proven difficult to identify conditions and precursors for the preparation of certain desirable metal chalcogenide nanoparticles using the co-precipitation process described above.

Another process for forming colloidal metal chalcogenide nanoparticles includes the use of a so-called single-source precursor. Single-source precursors are generally molecular precursors with the desired bonds already formed prior to the nanoparticle synthesis. This type of precursor can allow for the formation of nanoparticles with compositions that may be difficult to make and/or control through the traditional co-precipitation route, which involves bond making and breaking. Single-source precursors can also have the advantage of being more stable than their reagent counterparts. An air-stable precursor for the synthesis of cadmium and zinc sulfide/selenide nanoparticles has been reported, whereas the prior syntheses of these nanoparticles involved air-sensitive compounds. Another benefit of single-source precursors is that they can allow for synthesis of nanoparticles from relatively harmless reagents.

One disadvantage with single source precursors is that the synthesis of currently known precursors often involves highly reactive/toxic reagents and can be quite complex. As a result, the precursors are compositionally specific to the desired nanoparticles. A good example is the use of single-source precursors to synthesize CdSe nanoparticles. For example, some researchers have used diselenocarbamato cadmium complexes whereas others have used metal-chalcogenide thiophenolate clusters to synthesize the particles. Even more recently, the use of a thiocarbamoyl hydrazine cadmium complex for CdSe nanoparticle synthesis has been reported. In all of these syntheses, the precursor used can only make one type of nanoparticle. If nanoparticles with different characteristics, surfactants or composition are desired, the precursor must be completely redesigned and remade.

Accordingly, there is a need for a different class of single-source precursors suitable for the synthesis of colloidal metal chalcogenide nanoparticles in order to overcome the limitations of existing single-source precursor and expand the possibilities for synthesis of metal chalcogenide nanoparticles.

SUMMARY OF THE INVENTION

Exemplary embodiments include a method for forming colloidal metal chalcogenide nanoparticles comprising combining a hydrazine-based inorganic metal chalcogen cluster single source precursor and a surfactant in a solution; and heating the solution to a temperature effective to decompose the hydrazine-based inorganic metal chalcogen single source precursor and form the colloidal metal chalcogenide nanoparticles.

Further exemplary embodiments include a method comprising combining a preheated surfactant-containing solution with an inorganic metal chalcogen cluster single source precursor solution, wherein the preheated surfactant-containing solution is at a temperature effective to decompose the inorganic metal chalcogen single source precursor and form the colloidal metal chalcogenide nanoparticles.

Additional exemplary embodiments include a method comprising dissolving a soluble, first precursor in a solvent to form a first precursor solution, wherein the first precursor is inorganic and includes metal-chalcogen clusters; combining the first precursor solution with a surfactant or a surfactant solution to form, a first mixture; forming from said first precursor an organometallic second precursor that includes the metal-chalcogen clusters to form a second mixture; and heating the organometallic second precursor to decompose the metal-chalcogen clusters, thereby forming the colloidal metal chalcogenide nanoparticles.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
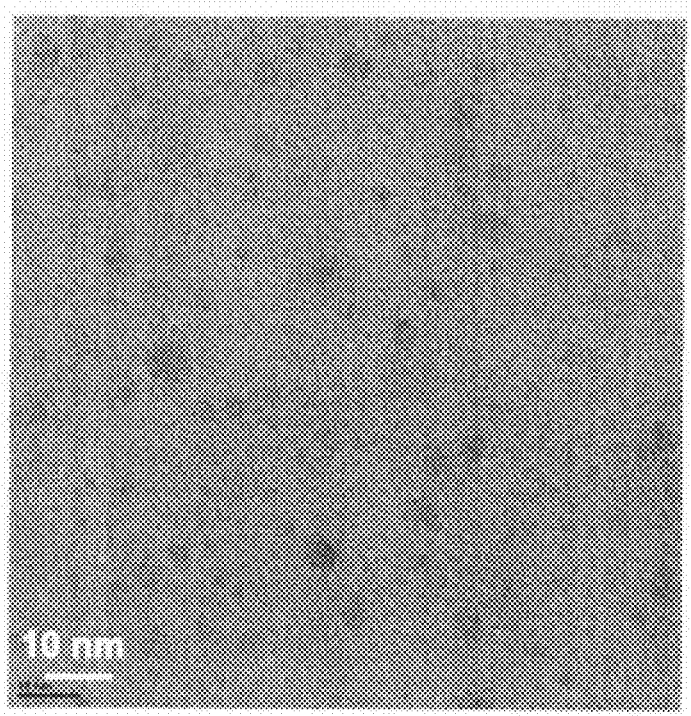
FIG. 1 is a transmission electron micrograph of $GeSe_x$ nanoparticles produced, in accordance with the present invention.

The detailed description explains the preferred embodiments of the invention, together with advantages and features, by way of example with reference to the drawings.

DETAILED DESCRIPTION OF THE INVENTION

The present invention provides a process for forming colloidal metal chalcogenide nanoparticles using soluble inorganic precursors containing metal-chalcogen clusters as a single-source precursor. In one embodiment, die process generally includes combining a hydrazine-based inorganic metal chalcogen cluster single source precursor and a surfactant in a solution; and heating the solution to a temperature effective to decompose the hydrazine-based inorganic metal chalcogen cluster single source precursor and form the colloidal metal chalcogenide nanoparticles As used herein, the term "inorganic metal-chalcogen cluster" generally refers to a group of at least two and not more than twenty atoms that include at least one chalcogen atom, at least one non-chalcogen metal atom and at least one metal to chalcogen chemical bond with the proviso that the cluster is in solution. In the solid phase, one of skill in the art will appreciate that infinite numbers of chains may form between clusters. In one embodiment, the inorganic metal-chalcogen cluster is free of carbon. The term "colloidal metal chalcogenide nanoparticles" as used herein refers to particles of inorganic metal-chalcogen clusters that are coated with surfactant and have an average diameter of 1 nanometer (am) to 100 nm. In one embodiment, the inorganic particles have an average diameter of 1 nm to 20 nm. The surfactant-coated inorganic particles are capable of forming a colloidal dispersion when dispersed in another substance. The method generally includes dissolving the inorganic metal-chalcogen cluster precursor(s) in a suitable solvent to form a precursor solution, combining the precursor solution with a surfactant or a surfactant-containing solution, and then heating this mixture to decompose the precursor and produce colloidal metal chalcogenide nanoparticles.

In various embodiments, the precursor solution may be combined with the surfactant prior to heating or added to a pre-heated surfactant or a surfactant-containing solution in order to control the size and size distribution of the resulting metal chalcogenide nanoparticles. In these embodiments, the mixture of the precursor solution and the surfactant is maintained at a temperature effective to decompose the metal chalcogen precursor in the solution and thereby form colloidal metal chalcogenide nanoparticles in the solution. Once the mixture is cooled, the nanoparticles are optionally separated as in other methods for isolating nanoparticles. For example, the nanoparticles can be purified by washing in a solvent/non-solvent pair such as hexane/methanol and recovered from the solution by centrifugation. The isolated colloidal metal chalcogenide nanoparticles remain coated with the surfactant and can therefore be re-dispersed into a variety of organic solvents for further processing into a variety of devices and applications.

Optionally, the inorganic metal-chalcogen cluster precursor may be combined with a surfactant or surfactant solution to form an organometallic metal-chalcogen cluster precursor, which may optionally be isolated and utilized in a similar manner to that described above to form the colloidal metal chalcogenide nanoparticles. The term "organometallic metal-chalcogen cluster precursor" refers to a compound containing metal-chalcogen clusters as generally defined above and including at least one hydrocarbon component chemically bonded (ionic, covalent, dative, or other type of chemical bond) to at least one atom included in the metal-chalcogen cluster, if the organometallic precursor is not isolated, this mixture can be heated as in the case of the inorganic metal-chalcogen cluster precursor to decompose the precursor and form the metal chalcogenide nanoparticles. If the organometallic precursor is isolated, then it is dissolved to form a precursor solution, which is then combined with a surfactant, or surfactant-containing solution, in the same way as described for the inorganic metal-chalcogen precursor and heated to form the nanoparticles.

The metal chalcogenide as used herein includes a metal, such as, Ge, Sn, Pb, Sb, Bi, Ga, In, Tl, Cu, or a combination thereof and a chalcogen, such as, S, Se, Te or a combination thereof. In one embodiment, the metal chalcogenide can be represented by the formula MX or $MX_2$, wherein M is the metal and X is the chalcogen. In another embodiment, the metal chalcogenide can be represented by the formula $M_2X_3$, wherein M is a metal, such as, Sb, Bi, Ga, In or a combination thereof and wherein X is a chalcogen, such as, S, Se, Te or a combination thereof. In yet another embodiment, the metal chalcogenide can be represented by the formula $M_2X$ wherein M is Tl and wherein X is a chalcogen, such as, S, Se, Te or a combination thereof.

A preferred procedure for forming the inorganic metal-chalcogen cluster precursor for processing is carried out by dissolving a metal chalcogen in a hydrazine-based solvent and stirring to produce a solution containing a hydrazine-based metal chalcogenide precursor. Optionally, an elemental chalcogen, such as, S, Se, Te or a combination thereof can be added. The excess hydrazine solvent is then removed by evaporation, for example, to leave a solid hydrazine-based inorganic metal-chalcogen cluster precursor.

Exemplary hydrazine compounds are represented by the formula: $R^1R^2N$—$NR^3R^4$, wherein each of $R^1$, $R^2$, $R^3$ and $R^4$ is independently hydrogen, aryl, methyl, ethyl or a linear, branched or cyclic alkyl of 3-6 carbon atoms. Preferably, in this method each of $R^1$, $R^2$, $R^3$ and $R^4$ is independently hydrogen, aryl, methyl or ethyl. More preferably, the hydrazine compound is hydrazine, i.e., where $R^1$, $R^2$, $R^3$ and $R^4$ are all hydrogens, methylhydrazine or 1,1-dimethylhydrazine.

In another embodiment, a procedure for forming the inorganic metal-chalcogen cluster precursor includes contacting the metal chalcogen with a salt of an amine to produce an ammonium-based precursor of the metal chalcogenide, wherein the amine compound is represented by the formula: $NR^5R^6R^7$, wherein each of $R^5$, $R^6$, and $R^7$ is independently hydrogen, aryl such as phenyl a linear or branched alkyl having 1-6 carbon atoms such, as methyl, ethyl or a cyclic alkyl of 3-6 carbon atoms. The ammonium-based precursor of the metal chalcogenide is then contacted with a hydrazine compound and optionally, an elemental chalcogen. By way of example, the method includes contacting at least one metal chalcogenide and a salt of an amine compound with $H_2S$, $H_2Se$ or $H_2Te$ to form an ammonium-based precursor of the metal chalcogenide, contacting the ammonium-based precursor with a hydrazine compound as noted above to produce a solution of a hydrazinium-based precursor of the metal, chalcogenide in the hydrazine compound.

In these embodiments, each of $R^1$, $R^2$, $R^3$, $R^4$, $R^5$, $R^6$ and $R^7$ can independently be hydrogen, aryl such as phenyl, alkyl having 1-6 carbon atoms such as methyl and ethyl. More typically, $R^1$, $R^2$, $R^3$, $R^4$, $R^5$, $R^6$ and $R^7$ can independently be hydrogen, aryl, methyl and ethyl. More typically $R^1$, $R^2$, $R^3$, $R^4$, $R^5$, $R^6$ and $R^7$ are all hydrogens.

Typically, the amine compound is $NH_3$, $CH_3NH_2$, $CH_3CH_2NH_2$, $CH_3CH_2CH_2CH_2$, $(CH_3)_2CHNH_2$, $CH_3CH_2CH_2CH_2NH_2$, phenethylamine, 2-fluorophenethylamine, 2-chlorophenethylamine, 2-bromophenethylamine, 3-fluorophenethylamine, 3-chlorophenethylamine, 3-bromophenethylamine, 4-bromophenethylamine, 2,3,4,5,6-pentafluorophenethylamine or a combination thereof.

The ammonium metal chalcogenide precursor can be prepared by a variety of techniques depending on the metal chalcogenide under consideration. Examples of such techniques include simple dissolution of the metal chalcogenide in an ammonium chalcogenide aqueous solution followed by evaporation of the solvent, typically at room temperature, solvothermal techniques and by solid-state routes at elevated temperatures. In contrast to most metal chalcogenides, which are not substantially soluble in common solvents, the ammonium salts can be highly soluble in common solvents.

Using these techniques, tertiary or higher order systems, (such as $SnS_{2-x}Se_x$) can also be conveniently formed as nanoparticles, enabling more detailed control over the band gap of the materials deposited. Thus, the present invention can be used most advantageously to form colloidal nanoparticles of main-group metal (e.g., Ge, Sn, Pb, Sb, Bi, Ga, In, Tl) and transition group metals.

The so-formed metal chalcogen cluster precursor is then mixed with a surfactant (neat or in solution) and subsequently heated to a temperature effective to decompose the precursor and form the colloidal metal chalcogenide nanoparticles.

Suitable surfactants that can be used include aliphatic carboxylic acids, fatty carboxylic acids, unsaturated carboxylic acids, n-alkylphosphonic acids, primary alkylamines, secondary alkylamines, tertiary alkyl amines, alkylphosphines, alkylphosphine oxides, all having from 1 to about 30, more preferably from about 6 to about 20 carbon atoms, and functionalized polymers, or any combination of these. Aliphatic carboxylic acids and alkylamines are preferred with aliphatic carboxylic acids most preferred. Illustrative examples of aliphatic carboxylic acids that can be employed in the present invention include, for example, caprylic acid, capric acid, lauric acid, myristic acid, palmitic acid, stearic acid, oleic acid, linoleic acid, and other like aliphatic carboxylic acids, including mixtures thereof. Some other non-limiting examples of surfactants that can be employed in the present invention include fatty carboxylic acids (such as lauric, myristic, palmitic and stearic acids), unsaturated carboxylic acids (such as elatic and oleic acids), 1-adamantanecacboxylic acid, n-alkylphosphonic acids (such as n-hexylphosphonic, n-octylphosphonic, n-decylphosphonic, n-tetradecylphosphonic and n-octadacylphosphonic acids), primary alkyl amines (such as octylamine, dodecylamine, hexadecylamine, octadecylamine and oleyl amine), secondary alkyl amines (such as dioctylamine), tertiary alkylamines (such as trioctylamine), alkyl phosphines (such as tri-n-octylphosphine and tri-n-butylphosphine), alkyl phosphine oxides (such as tri-n-octylphosphine), fluorinated fatty carboxylic acids, fluorinated alkyl phosphines, functionalized polymers (such as poly(1-vinylpyrrolidone)-graft-(1-hexadecene)), mixtures of the foregoing, and the like.

The amount of surfactant added to the metal chalcogen cluster precursor may vary and is not believed to be critical to the present invention so as long as a sufficient amount of surfactant is employed which can serve as a passivation layer for the subsequently formed colloidal nanoparticles. The term, "passivation layer" is used in the present invention to denote a medium in which the surface of the nanoparticles is covered by a monolayer of amphiphilic species which ideally help to passivate dangling bonds at the surface and also provide a steric colloidal stabilization that prevents the particles from aggregating irreversibly. Typically, the surfactant is employed in the present invention in an amount to provide a ratio of surfactant to first precursor from about 1:2 to about 1:50. More specifically, the surfactant is employed in the present invention in an amount to provide a ratio of surfactant to first precursor from about 1:3 to about 1:6.

If a surfactant-containing solution is used, the surfactant or combination of surfactants is dissolved in an organic solvent that is inert with the precursor and/or any other components used to form the colloidal nanoparticles (i.e., doesn't react). In one embodiment, the solvent for the surfactant solution is selected to have a boiling point greater than about 100° C. The solvent may include ethers (such as benzyl ether, phenyl ether, or octyl ether), alkanes or alkenes (such as 1-octadecene, squalane, or octadecane), alcohols or diols (such as 1,2-hexadecandiol), or other solvents meeting the criteria listed including a combination of solvents.

When the mixture of the precursor solution and surfactant or surfactant-containing solution is heated to decompose the precursor it will preferably be heated to a temperature above 80° C. and not more than 400° C., and in other embodiments, between 80° C. and 250° C. If the precursor solution is mixed with the surfactant or surfactant solution prior to heating, the heating is carried out at a controlled rate between (1.1 and 120 degrees Kelvin per minute (K/min), preferably between 1 and 10 K/min.

The solvent used to dissolve the hydrazine-based metal chalcogenide precursor or the ammonium based metal chalcogenide precursor is any solvent that dissolves the precursor. In one embodiment, the precursor solvent has a solubility limit of at least 5 mg/mL. It is preferred that the precursor solvent be miscible with the surfactant or with the surfactant solution at the temperature of nanoparticle nucleation and growth. Suitable non-limiting examples include ethanolamine, dimethylsulfoxide, dimethylformamide, N-methylformamide, 1-methylimidazole, any hydrazine compound (such as hydrazine or an alkylhydrazine), or a combination of these.

The following non-limiting example is presented to better illustrate the present disclosure.

EXAMPLE

In this example, $GeSe_x$ nanoparticles were prepared using an inorganic Ge—Se cluster precursor. To prepare the precursor, equimolar amounts of Ge(II)Se and Se were dissolved into distilled hydrazine ($N_2H_4$). After all of the Ge(II)Se and Se solids were dissolved in the hydrazine, the excess hydrazine solvent was evaporated off leaving a red, glassy solid. To prepare the nanoparticles, 70 milligrams (mg) of the above described precursor were dissolved into 3 milliliters (mL) of ethanolamine and injected into 5 mL of ethylhexanoic acid at 200° C. under flowing nitrogen. The reaction was maintained at 200° C. for a period of 2 to 40 minutes. The variation in reaction time provided different particle sizes with the longer reaction time providing the largest particle sizes. After cooling the reaction mixture to room temperature, excess ethanol was added to precipitate the nanoparticles. The nanoparticles so obtained were soluble in various non-molar solvents (e.g., toluene, chloroform), and were re-precipitated in ethanol in order to eliminate excess surfactant.

Figure 2:
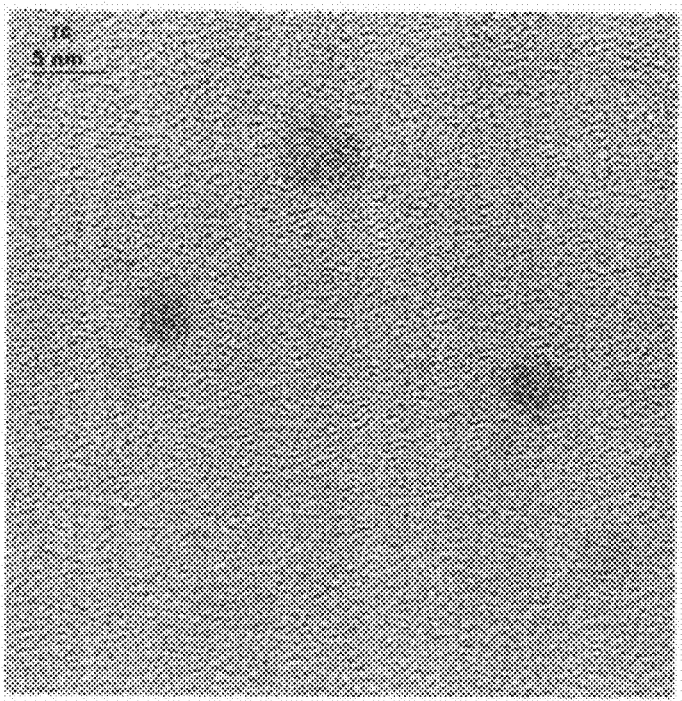
FIG. 2; is a high resolution transmission electron micrograph of $GeSe_x$ nanoparticles produced in accordance with the present invention.
Figure 3:
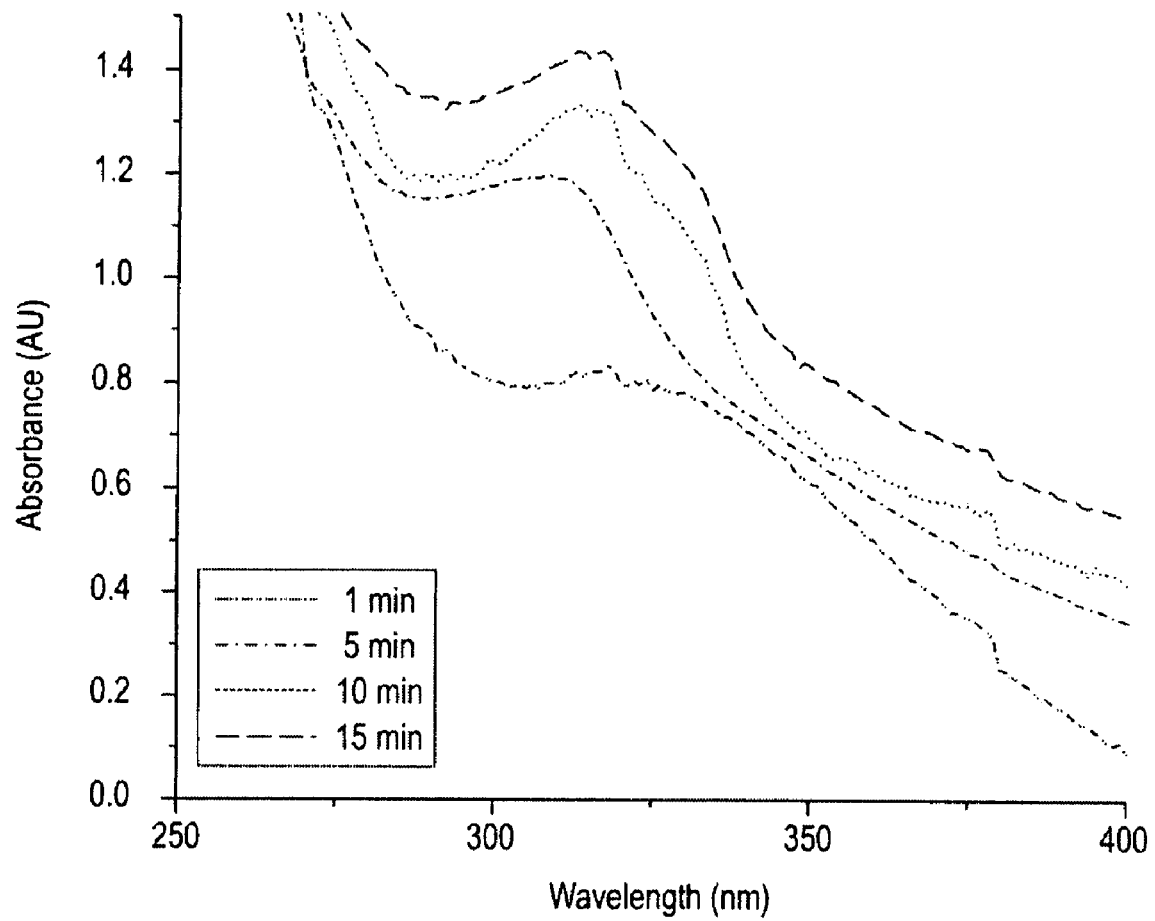
FIG. 3 graphically illustrates overlayed UV-Vis spectra for a $GeSe_x$ reaction mixture taken at different reaction times during formation of $GeSe_x$ nanoparticles prepared in accordance with the present invention.

FIG. 1 shows a transmission electron micrograph (TEM) micrograph of nanoparticles made from the inorganic Ge—Se cluster precursor. The nanoparticles were approximately 5 nm in diameter and well dispersed. As shown in FIG. 2, high-resolution TEM showed lattice fringes on the nanoparticles, which are characteristic of a crystalline or noncrystalline phase. Nanoparticle growth was monitored using ultraviolet-visible (UV-Vis) spectroscopy via the characteristic first exiton peak. FIG. 3 shows UV-Vis spectra as a function of reaction time. As the reaction time increased, the peak shifted towards longer wavelengths indicating nanoparticle growth.

Advantageously, the methods of producing metal chalcogenide nanoparticles using the inorganic metal chalcogen single source precursors have several advantages over previously known methods. First, the inorganic metal-chalcogen precursors, and especially those which are hydrazine-based, contain unique metal-chalcogen combinations that have previously been difficult to prepare or unknown in colloidal nanoparticles so that this method expands the materials that can be prepared as metal chalcogenide nanoparticles. Second, like other single-source precursor routes to colloidal nanoparticles, but unlike the more common routes which use separate metal and chalcogen precursors, the single source precursors contain pre-formed metal-chalcogen bonds. This allows the formation of crystalline nanoparticles (for that matter, any kind of nanoparticle) at lower temperatures than is normally possible using the common approach. Such precursors are particularly known for their low decomposition temperatures making the entire class of compounds potentially suitable for synthesizing nanoparticles in the solution phase.

The combination of these benefits provides a route to crystalline nanoparticles that cannot currently be prepared by any other means. Unlike other single-source precursors to nanoparticles, these precursors can be made by a general strategy, using exceptionally simple methods. These characteristics of the inorganic metal-chalcogen cluster precursors make the disclosed method more versatile for the preparation of a wide range of metal chalcogenide materials than other single source precursor methods.

While the preferred embodiment to the invention has been described, it will be understood that those skilled in the art, both now and in the future, may make various improvements and enhancements which fell within the scope of the claims which follow. These claims should be construed to maintain the proper protection for the invention first described.

What is claimed is:

1. A method for forming colloidal metal chalcogenide nanoparticles, comprising:
   combining a hydrazine-based inorganic metal chalcogen cluster single source precursor and a surfactant in a solution; and heating the solution to a temperature effective to decompose the hydrazine-based inorganic metal chalcogen cluster single source precursor and form the colloidal metal chalcogenide nanoparticles, wherein the hydrazine-based metal chalcogen cluster single source precursor is formed by a process comprising:
   dissolving a metal and a chalcogen or a combination of chalcogens in a hydrazine solvent, wherein the hydrazine solvent is represented by the formula:

$R^1R^2N—NR^3R^4$, wherein each of $R^1$, $R^2$, $R^3$ and $R^4$ is independently selected from the group consisting of hydrogen, aryl, methyl ethyl, linear alkyl of 3-6 carbon atoms, branched alkyl of 3-6 carbon atoms and cyclic alkyl of 3-6 carbon atoms; and
   removing substantially all of the solvent to form the hydrazine-based inorganic metal chalcogen cluster single source precursor in a solid form.

* * * * *